US008696097B2

(12) United States Patent
Tsai

(10) Patent No.: US 8,696,097 B2
(45) Date of Patent: Apr. 15, 2014

(54) SYSTEM AND METHOD FOR GENERATING EDIBLE DECORATIVE ITEMS

(76) Inventor: Sean Tsai, Walnut, CA (US)

( * ) Notice: Subject to any disclaimer, the term of this patent is extended or adjusted under 35 U.S.C. 154(b) by 723 days.

(21) Appl. No.: 12/890,442

(22) Filed: Sep. 24, 2010

(65) Prior Publication Data

US 2012/0075391 A1 Mar. 29, 2012

(51) Int. Cl.
*B41J 2/175* (2006.01)
*A23G 3/28* (2006.01)

(52) U.S. Cl.
USPC .......... 347/86

(58) Field of Classification Search
USPC .......... 347/2, 5, 19, 86; 358/1.1; 106/31.13; 118/13–14, 16, 29
See application file for complete search history.

(56) References Cited

U.S. PATENT DOCUMENTS 4,910,661 A 3/1990 Barth et al.
4,975,718 A * 12/1990 Akami et al. .......... 347/55
7,286,258 B2 * 10/2007 Schnoebelen et al. .......... 358/1.18
2008/0165214 A1 7/2008 Yuen
2011/0025735 A1 * 2/2011 Nohilly et al. .......... 347/2

* cited by examiner

*Primary Examiner* — Anh T. N. Vo
(74) *Attorney, Agent, or Firm* — Finnegan, Henderson, Farabow, Garrett & Dunner, LLP

(57) ABSTRACT

A system for generating an edible decorative item for a food product is provided. The system includes a computer including a processor for executing computer program codes. The computer also includes a display device for displaying a user interface. The system also includes an image forming apparatus including a spongeless ink cartridge for storing an edible ink. The spongeless ink cartridge does not include a sponge. The image forming apparatus also includes an image forming unit for forming an image on an edible image formation medium to generate the edible decorative item.

16 Claims, 13 Drawing Sheets

SYSTEM AND METHOD FOR GENERATING EDIBLE DECORATIVE ITEMS

TECHNICAL FIELD

The present disclosure relates generally to a system and method, more particularly, to a system and method for generating edible decorative items.

BACKGROUND

Some food products, such as cakes and cookies, are popular items for special events, including, for example, a birthday, a wedding ceremony, and an anniversary ceremony. People typically make the cakes at home, but more often, order the cakes from a bakery. To add more happiness to the special events, people sometimes wish to add decorative items, such as special words, symbols, images (e.g., pictures or photos), flowers, etc., on top of the cakes. These decorative items are typically produced on the cakes by manually applying a layer of color icing and/or frosting to the top surface of the cakes using an applicator, such as a nozzle. Manual decorating of the cakes, however, entails excellent skills, and is labor intensive.

Alternative systems have been developed to make cake decoration easier and more convenient. Some systems use a conventional printer or photocopier to form an image on an edible medium, such as an edible paper, and then place the edible medium, on which the image has been formed, on the cakes. This type of system enables a user to apply virtually anything that is desirable to the cakes.

These conventional printers and/or photocopiers are typically equipped with conventional ink cartridges that are originally designed only for normal document/photo printing/photocopying purposes, but are not designed for the food industry. In the current market, many ink cartridges for printing such decorative items in food industry either simply replicate the design of the conventional ink cartridges, or use recycled ink cartridges from the document/photo printing industry.

When used in the food industry, these conventional ink cartridges filled with edible inks pose a serious health concern. A conventional ink cartridge is typically provided with a sponge within an ink reservoir. The sponge provides several functionalities, among which is to keep a pressure balance and to absorb and hold the ink so that the ink does not leak from the reservoir or does not dry up quickly. However, the sponge provides a place for molds, yeasts, and/or bacteria to grow under room moisture and temperature. Although the molds, yeasts, and/or bacteria grown in the sponge may not be seen by naked eyes, they may contaminate the edible ink. Thus, when the edible ink is used in printing edible decorative items, which are subsequently consumed by a consumer, the consumer's health may be seriously threatened. In addition, when consumers learn of the possible existence of molds, yeasts, and/or bacteria in the ink that is used in forming the edible decorative items, they may no longer feel comfortable in purchasing food products with edible decorative items. This may damage the image of the store or bakery that sell the food products having the edible decorative items, which may result in a decline in the business of the store or bakery.

The present disclosure is directed toward improvements in the existing technology for generating edible decorative items in the food industry.

SUMMARY

In one aspect, the present disclosure is directed to a system for generating an edible decorative item for a food product.

The system includes a computer including a processor for executing computer program codes. The computer also includes a display device for displaying a user interface. The system also includes an image forming apparatus including a spongeless ink cartridge for storing an edible ink. The spongeless ink cartridge does not include a sponge. The image forming apparatus also includes an image forming unit for forming an image on an edible image formation medium to generate the edible decorative item.

In another aspect, the present disclosure is directed to a spongeless ink cartridge configured to store an edible ink for generating an edible decorative item. The spongeless ink cartridge includes a housing. An inner space enclosed by the housing is substantially used for storing the edible ink and does not store a sponge therein. The spongeless ink cartridge also includes an air vent hole, an ink exit port, and an air tube disposed within the housing and extending from the air vent hole to the inner space.

In another aspect, the present disclosure is directed to a method for generating an edible decorative item for a food product. The method is implemented by a computer including a processor for executing program codes. The method may include displaying one or more templates on a display device for a user to select. One or more frames may be displayed on the display device for the user to select. An image may be received from a source specified by the user. The image may be displayed to allow the user to edit the image, and the system may receive user edits of the image. The image may be printed on an edible image formation medium using a printer having a spongeless ink cartridge that stores an edible ink, wherein the spongeless ink cartridge includes a housing enclosing an inner space for storing the edible ink, and wherein the spongeless ink cartridge does not include a sponge within the inner space.

DETAILED DESCRIPTION

Consistent with the disclosed embodiments, edible decorative items may be generated by using any suitable image forming apparatus, including, for example, inkjet and laser printers and photocopiers. For simplicity, in below discussions, an inkjet printer is used as a representative image forming apparatus to produce an edible decorative item by printing an image onto an edible image formation medium. However, it is understood that the disclosed technology is not intended to be limited to applications with printers. For example, the disclosed image forming apparatus may also include a photocopier, and that the edible decorative item may be generated using the photocopier by copying the image onto the edible image formation medium. Thus, in below discussions, the term "printer(s)" represents any suitable image forming apparatus, and may include one or more functions of printing, photocopying, or scanning.

An edible decorative item may include, for example, an image printed on the edible image formation medium. The term "image" refers to anything that may be formed on the edible image formation medium, including, but not limited to, a picture, a photo, a word, a phrase, a sentence, and a symbol.

Figure 1:
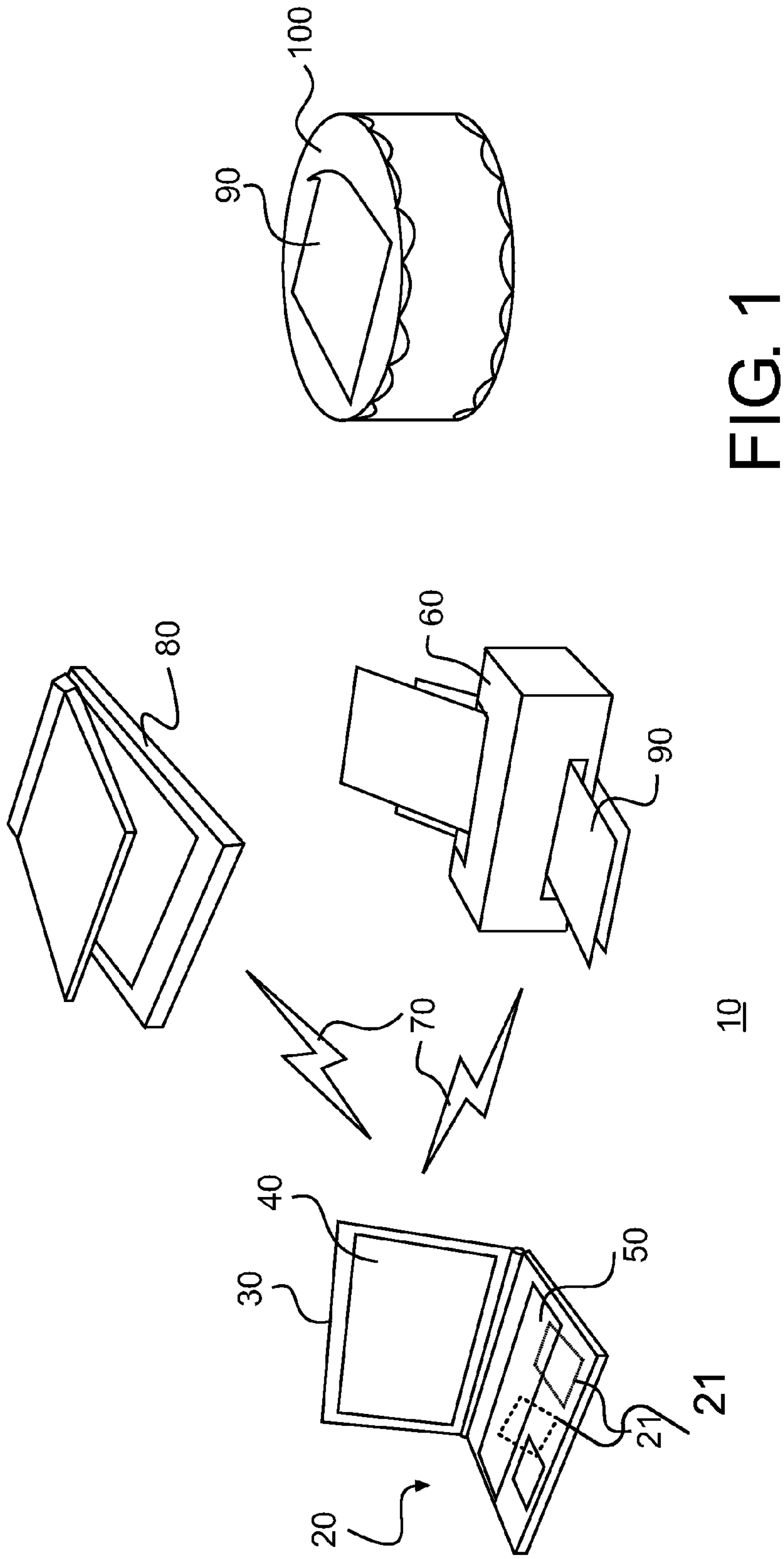
FIG. 1 is a schematic illustration of an exemplary system for generating edible decorative items for food products consistent with the disclosed embodiments.

FIG. 1 is a schematic illustration of an exemplary system 10 for generating edible decorative items for food products. System 10 may be employed in the commercial food industry, for example, in bakeries, grocery stores, and/or restaurants where food products, such as cakes having the edible decorative items may be sold or consumed. System 10 may also be employed at a user's home for personal use.

System 10 may include a computer 20. Computer 20 may be any suitable computing device that includes a processor 21 for processing data and executing program codes or instructions. As known in the art, computer 20 may also include a memory (not shown), which may be any suitable memory, such as a random access memory (RAM), a read-only memory (ROM), a flash memory, etc. Computer 20 may be a laptop, a desktop, a server, a workstation, a netbook, a tablet, and a handheld device.

Computer 20 may include a display device 30. Display device 30 may include any suitable display screen, such as a CRT screen, an LCD screen, an LED backlight screen. Display device 30 may include a touch screen. The touch screen may support single, dual, and/or multi-touch functionalities. Display device 30 may display a user interface 40. User interface 40 may be associated with a software program executed by processor 21 for ordering edible decorative items or for preparing images for generating the edible decorative items. User interface 40 may include a plurality of functional buttons displayed on display device 30. A user may perform various tasks, e.g., selecting, deleting, moving, copying and pasting an item, inputting a message or command, using the functional buttons of user interface 40. The term "button" refers to any suitable forms of visual display that may be employed on user interface 40. For example, the term "button" may include a button, a box, an icon, an image, or a combination of a button, a box, an icon, and any other suitable forms of visual display. When the user "select" an item displayed on screen 30, the user may select the item by tapping, dragging, pressing, touching, pinching, clicking, and/or flicking the item.

Computer 20 may include a keyboard 50. In one embodiment, keyboard 50 may be eliminated. A virtual keyboard may be displayed on screen 30 to receive the user's input. As known in the art, computer 20 may also include various ports, for example, a VGA port, one or more UBS ports, a network connection port, an audio port, and a card reader. Computer 20 may also include a speaker, a disk drive, such as, a Compact Disk (CD) drive, a Digital Video Disk (DVD) drive, a Blue-ray disk drive, and/or a combo drive that may combine all of the functions of a CD drive, a DVD drive, and a Blue-ray disk drive. Computer 20 may also include a wireless connection device, such as, for example, a Bluetooth connection device, a WiFi connection device, and an infrared connection device.

Computer 20 may be connected with one or more periphery devices through a network 70. Network 70 may utilize any suitable wired or wireless connection technologies, such as LAN, WAN, WiFi, infrared, radio, and/or Bluetooth. Although not shown, computer 20 may be connected to a payment processing system.

Computer 20 may be connected with an image forming apparatus 60 via network 70. Image forming apparatus 60 may be any suitable image forming devices, such as a printer and/or a photocopier. For illustration purpose, image forming apparatus 60 is shown as a printer. In below discussion, the printer is used as an exemplary image forming apparatus 60. Thus, image forming apparatus 60 is referred to as printer 60.

Computer 20 may also be connected with a scanner 80. Scanner 80 may be any suitable scanner, such as a flat-bed scanner, a color scanner, a black-and-white scanner, or a photo scanner. The user may scan an image, such as a photo, using scanner 80. Computer 20 may receive the scanned image from scanner 80 via network 70. Although shown as a separate device, scanner 80 may be integral with printer 60.

Printer 60 may be a dedicated printer, or may be an all-in-one type printer. As a dedicated printer, printer 60 may only includes a printing function. As an all-in-one type printer, printer 60 may include a printing function and one or more of a scanning function and a photocopying function. Printer 60 may be a black-and-white printer, or a color printer. Printer 60 may be an inkjet printer or a laser printer.

Printer 60 may print an image on an edible image formation medium 90. Edible image formation medium 90 may be any commercially available edible medium that is suitable for image formation. For example, edible image formation medium 90 may be a special paper made from rice, sugar, oil, syrup, among other ingredients, using a special process known in the art. Edible image formation medium 90 having an image printed thereon may be placed on a food product 100, such as a cake.

Figure 2:
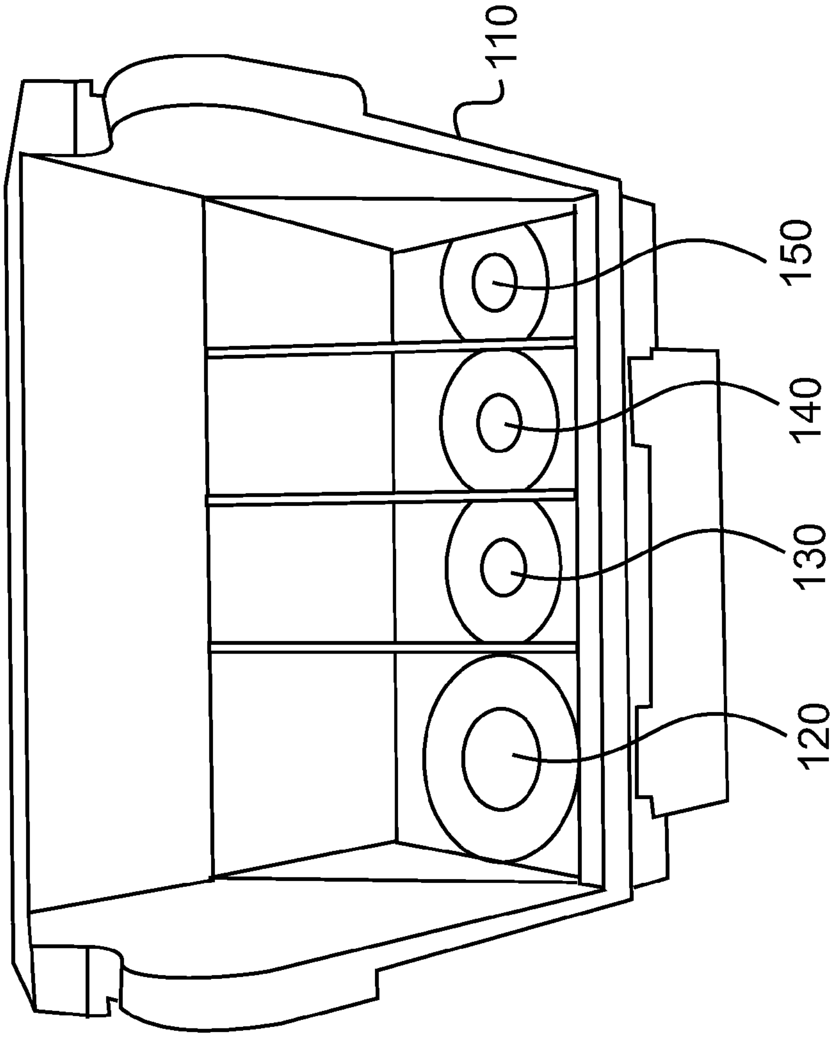
FIG. 2 is a schematic illustration of an exemplary image forming unit consistent with the disclosed embodiments.

FIG. 2 illustrates an exemplary image forming unit 110 that may be employed in printer 60. For illustration purpose, a print head is shown as an exemplary image forming unit. It is understood that image forming unit 110 may be any other type of suitable image forming unit, such as a drum used in a laser printer or a photocopier. In below discussion, for convenience, image forming unit 110 is referred to as print head 110.

Print head 110 may be employed in any type of printer, including, for example, a color inkjet printer, a black-and-white inkjet printer, or a color or black-and-white laser printer. Print head 110 may include one or more ink cartridge holders 120, 130, 140, and 150 that are designed to hold ink cartridges. For example, in a color inkjet printer 60, print head

110 may include four ink cartridge holders 120, 130, 140, and 150 to hold black, red, blue, and yellow ink, respectively. Print head 110 may be a removable print head. That is, print head 110 may be easily removed from printer 60 for service, such as for cleaning, repair, or replacement. With or without print head 110 being removed from printer 60, ink cartridges may be removed from ink cartridge holders 120, 130, 140, and 150 for service, such as for inspection, replacement, repair, or refill.

Figures 3A, 3B:
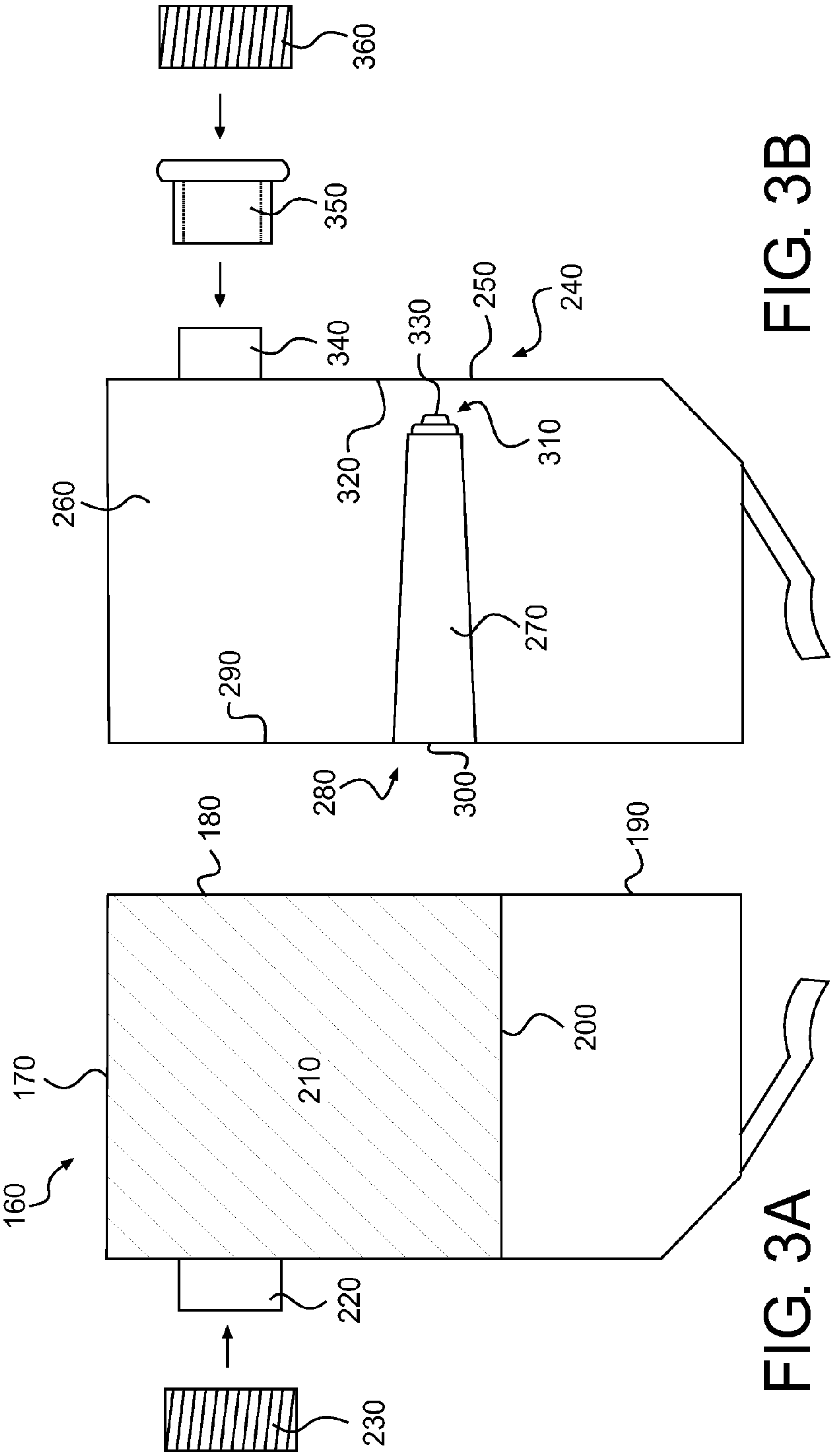
FIG. 3A is a schematic illustration of an inside structure of a conventional ink cartridge.
FIG. 3B is a schematic illustration of an inside structure of an exemplary ink cartridge consistent with the disclosed embodiments.

FIGS. 3A and 3B illustrate a comparison between the inside structure of a conventional ink cartridge 160 (FIG. 3A) and that of an ink cartridge 240 consistent with the disclosed embodiments (FIG. 3B). Conventional ink cartridge 160 may include a housing 170. An inside space enclosed by housing 170 may be divided into a first space portion 180 and a second space portion 190. The first and second space portions 180 and 190 may be separated by a wall 200. Wall 200 may include a web structure or a plurality of holes for an ink to flow into first space portion 180. In one embodiment, ink cartridge 160 may not include wall 200.

The first space portion 180 may hold a sponge 210. Sponge 210 may be made of any suitable material. An ink may be stored in the second space portion 190, which functions as an ink reservoir. The ink may be absorbed and held by sponge 210. Conventional ink cartridge 160 may also include an ink exit port 220 disposed outside the first space portion 180 that holds sponge 210. During printing, a small amount of ink from sponge 210 may flow out of ink cartridge 160 through ink exit port 220. Ink cartridge 160 may include a cover 230 that may be attached to and detached from ink exit port 220. Cover 230 may be applied to ink exit port 220 during transportation or storage of ink cartridge 160 to prevent ink leakage and/or to prevent the ink from drying up due to exposure to outside air.

As shown in FIG. 3B, ink cartridge 240 consistent with the disclosed embodiments may include a housing 250. Housing 250 may enclose a single inner space 260 within ink cartridge 240. The entire inner space 260 of ink cartridge 240 may function as an ink reservoir for storing an ink, such as an edible ink for use in the food industry. Unlike conventional ink cartridge 160, no sponge is provided in ink cartridge 240 to absorb and hold the ink. Thus, the space otherwise occupied by a sponge in conventional ink cartridge 160 is released and used for storing the ink. As a result, more ink may be stored in ink cartridge 240 than in conventional ink cartridge 160 of a similar size. Ink cartridge 240 may be referred to as spongeless ink cartridge 240.

Referring to FIG. 3B, ink cartridge 240 may include an air tube 270. Air tube 270 may include a first end 280 attached to a first inner wall 290 of housing 250. At the first end 280, air tube 270 may include an air vent hole 300. Air tube 270 may extend from the first inner wall 290 into inside space 260. The second end 310 may maintain a distance from the second inner wall 320. At the second end 310, air tube 270 may include an air control valve 330. Air control valve 330 may be disposed at a position close to a bottom side of ink cartridge 240 when ink cartridge 240 is installed in printer 60.

During printing, air may flow into ink cartridge 240 through air vent hole 300, air tube 270, and air control valve 330. During printing, air control valve 330 may open to allow air to flow into space 260 where ink is stored. When printing is not performed, air control valve 330 may maintain a closed state. Air may not be leaked into ink cartridge 240 when air control valve 330 is closed.

Ink cartridge 240 may include an ink exit port 340. Ink cartridge 240 may also include a plug 350. Plug 350 may be applied to ink exit port 340 to cover ink exit port 340. A user may push plug 350 into ink exit port 340. Plug 350 may occupy and cover the entire ink exit port 340. Although shown as separate elements, ink exit port 340 and plug 350 may be integrated as a single unit. Plug 350 may be made of a soft and/or elastic material, such as a silicon rubber. When ink exit port 340 and plug 350 are integrated as a single unit, the entire single unit including ink exit port 340 and plug 350 may be made of the soft and/or elastic material, such as the silicon rubber. Ink cartridge 240 may further include a cover 360. Cover 360 may be applied to cover the plug 350 and ink exit port 340, thereby further preventing ink leakage.

Figure 4:
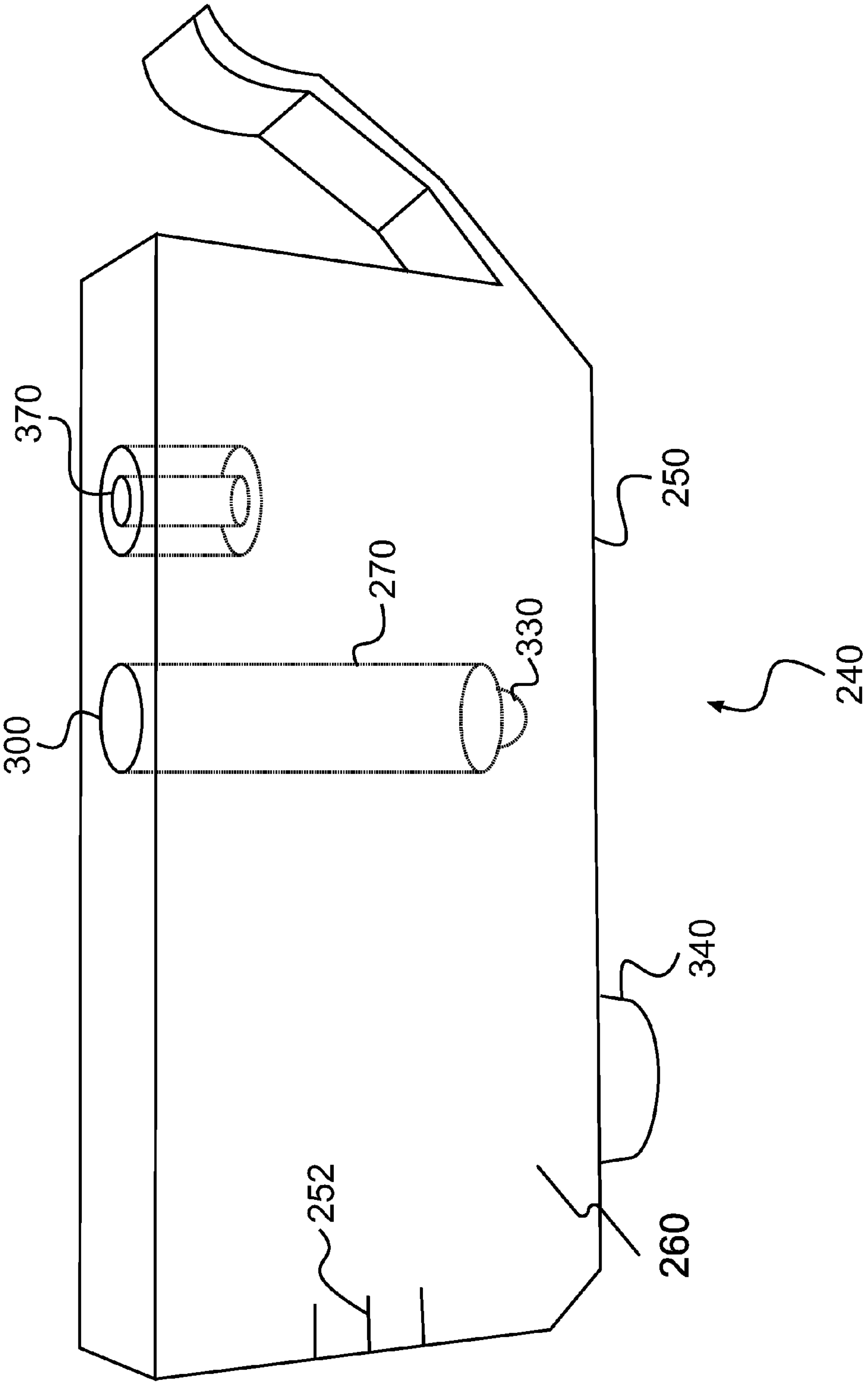
FIG. 4 is a schematic perspective view of an exemplary ink cartridge consistent with the disclosed embodiments.

FIG. 4 is a schematic perspective view of ink cartridge 240 consistent with disclosed embodiments. As shown in FIG. 4, air tube 270 is provided within space 260 enclosed by housing 250. Air tube 270 is at least partially submerged in ink when space 260 is filled with ink. Ink cartridge 240 may include an ink filling hole 370, through which ink may be filled into ink cartridge 240. After ink is filled into ink cartridge 240, ink filling hole 370 may be sealed, for example, by covering ink filling hole 370 with a tape, to prevent ink leakage.

Housing 250 may be made of any suitable materials, including, for example, plastic, metal, or polymer. In one embodiment, housing 250 may be made of a transparent or translucent material so that the color ink stored within ink cartridge 240 may be partially seen from outside of ink cartridge 240. A user may easily inspect whether there is ink in ink cartridge 240, and how much ink remains in ink cartridge 240. In one embodiment, ink cartridge 240 may include volume marks 252 on the outside body of housing 250 to indicate the volume of ink. Ink exit port 340 may be made of the same material used for housing 250, or may be made of a different material than that of housing 250.

Figure 6:
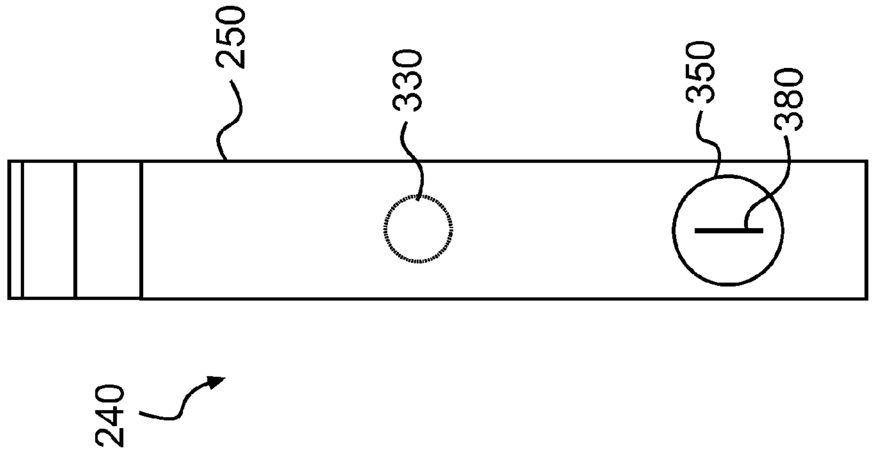
FIG. 6 is a bottom view of the exemplary ink cartridge shown in FIG. 4 consistent with the disclosed embodiments.
Figure 5:
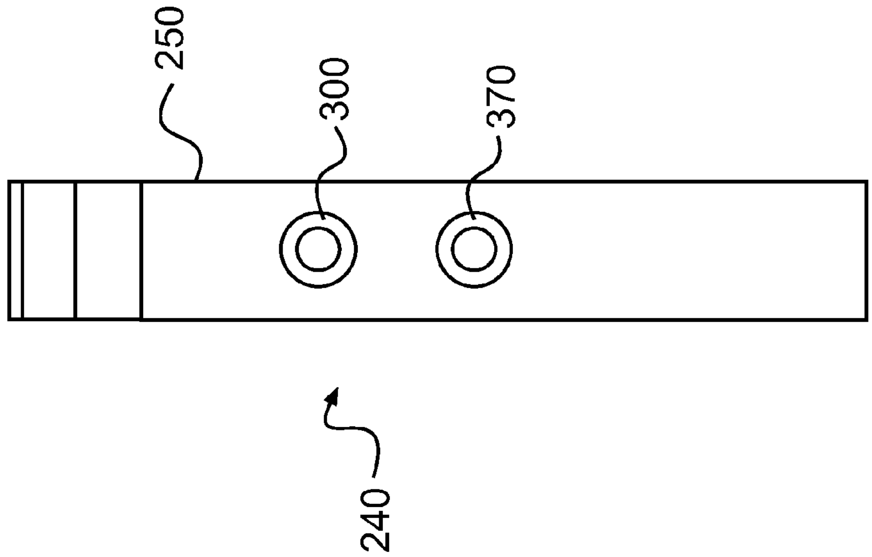
FIG. 5 is a top view of the exemplary ink cartridge shown in FIG. 4 consistent with the disclosed embodiments.

FIG. 5 schematically illustrates a top view of ink cartridge 240 consistent with the disclosed embodiments. FIG. 6 schematically illustrates a bottom view of ink cartridge 240. As shown in FIG. 6, when housing 250 is made of a transparent or translucent material, air control valve 330 disposed within space 260 may be partially seen from the bottom of ink cartridge 240.

Figure 7A:
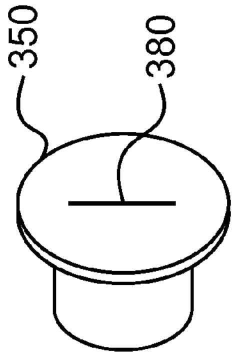
FIG. 7A is an exemplary plug shown in FIG. 3 consistent with the disclosed embodiments.
Figure 7B:
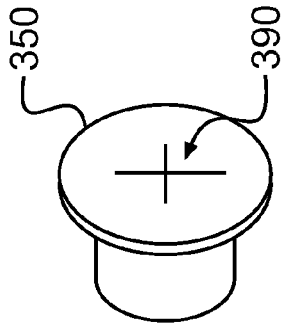
FIG. 7B is an exemplary plug shown in FIG. 3 consistent with the disclosed embodiments.

As shown in FIG. 6, plug 350 may include an opening 380. Opening 380 may take any suitable shape, for example, a single-line-cut shape, a crossing-line-cut shape, or other shapes. FIGS. 6 and 7A illustrates an opening 380 having a single line cut shape. The single-line-cut shape may be formed by a cutting in plug 350. FIG. 7B illustrates an opening 390 having a crossing-line cut shape. The crossing-line-cut shape may be formed by cutting plug 350 with two crossing lines. During printing, opening 380 having a single-line-cut shape or a crossing-line-cut shape may open under a pressure from the ink stored in ink cartridge 240 to allow a certain amount of ink to flow out for printing. When printing is not performed, opening 380 having a single-line-cut shape or a crossing-line-cut shape may close tightly due to the elasticity, thereby preventing ink from leaking, or preventing ink from being exposed to outside air.

Figure 8:
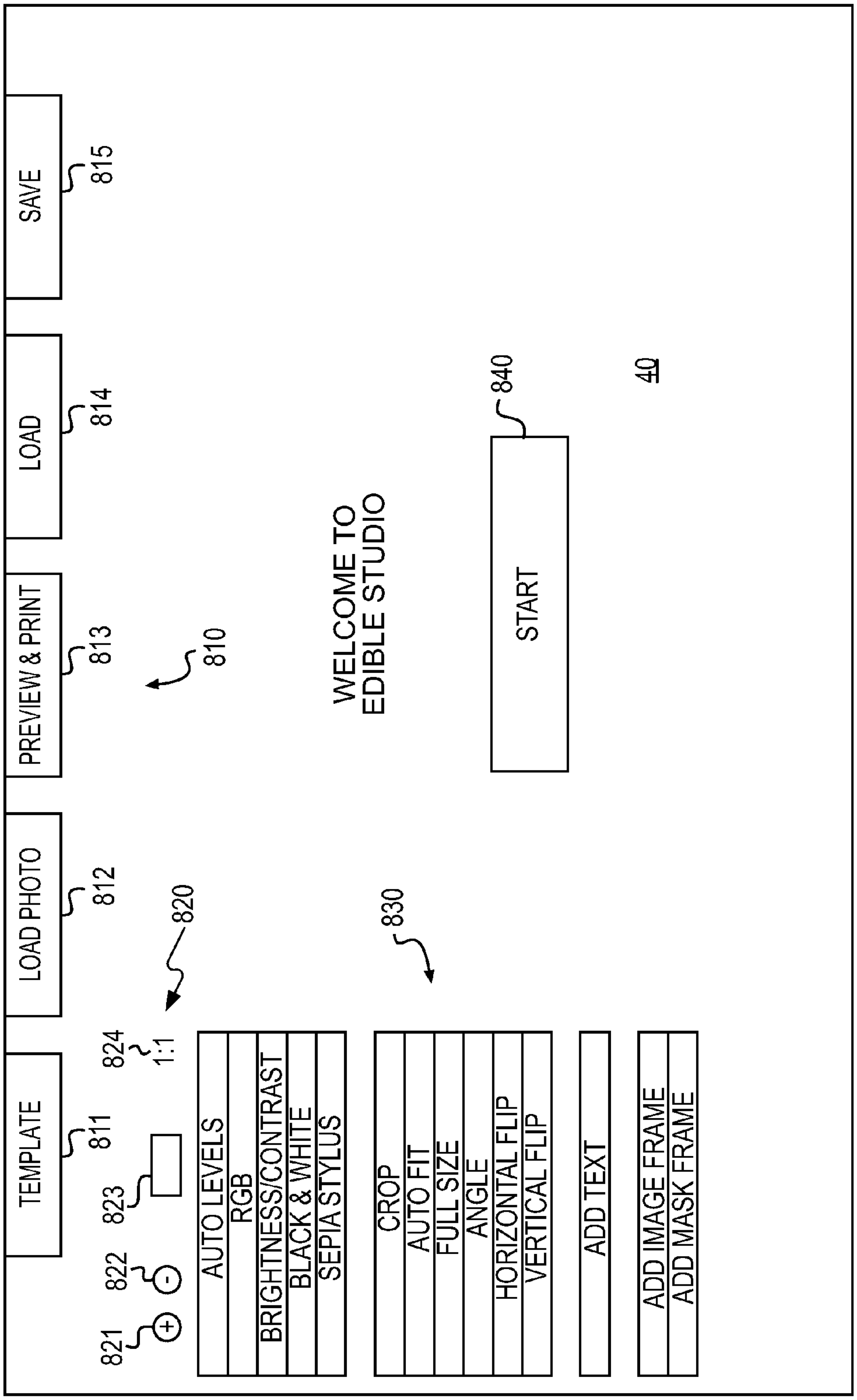
FIG. 8 is an exemplary screen display of user interface consistent with the disclosed embodiments.

FIG. 8 illustrates an exemplary screen display of user interface 40 consistent with the disclosed embodiments. User interface 40 may be displayed on display device 30. User interface 40 may be implemented as a computer software program that may be executed by processor 21 of computer 20. The software program may be encoded in a non-transitory computer-readable medium, such as a Compact Disk (CD), a Digital Video Disk (DVD), a blue-ray storage disk, a flash memory storage card, a secure digit (SD) card, a multi-media card, etc. The software program may be loadable into the at least one memory of computer 20.

The screen display of user interface 40 illustrated in FIG. 8 may be a welcome screen when a user initiate a process to generate edible decorative items using system 10. The user may use user interface 40 to order or to configure an image to be printed on edible image formation medium 90. User interface 40 may display a "WELCOME TO EDIBLE STUDIO," wherein "EDIBLE STUDIO" may be the name of the bakery, the store, or system 10. User interface 40 may display at, for example, the top portion of the screen, a system menu 810. System menu 810 may include a plurality of functions, which may be shown as buttons or sub-menus. The functional buttons may include one or more of a "template" button 811, a "load photo" button 812, a "preview & print" button 813, a "load" button 814, and a "save" button 815. In some embodiments, system menu 820 may include more or less number of buttons.

When a user selects "template" button 811, user interface 40 may display a screen or a pop-up window to allow the user to select a template from a plurality of saved templates, create or customize a template, or open a recently used template. When the user selects "load photo" button 812, user interface 40 may allow the user to load new photos from computer 20, or from any periphery devices connected to computer 20, such as, for example, a USB device, a scanner, a CD, etc. When the user selects "preview & print" button 813, user interface 40 may display an image in a preview mode, and may allow the user to print the image on edible image formation medium 90 on printer 60.

When the user selects "load" button 814, user interface 40 may allow the user to load a previously saved photo, for example, from a storage hard disk, or a memory provided with computer 20. In one embodiment, when the user selects "load" button 814, user interface 40 may also allow the user to select a new photo from computer 20 or any periphery devices connected with computer 20. In some embodiments, when the user selects "load" button 814, user interface 40 may also allow the user to load a previously created order or project, a previously incomplete order or project, or a previously completed order or project. When the user selects "save" button 815, the user may save the order in computer 20 or in any periphery devices connected with computer 20. "Save" button 815 may also allow the user to save an edited image or a newly created or customized template.

User interface 40 may also include a image display adjustment menu 820 and a second image editing menu 830. Image display adjustment menu 820 may include a plurality of functional icons for adjusting the display of an image on user interface 40 or the screen of display device 30. An "icon" refers to any suitable form of virtual display. For example, an icon may be a button, an image, a symbol, or a combination of a button, an image, and/or a symbol.

Image display adjustment menu 820 may include an enlarging-image icon 821. When a user clicks enlarging-image icon 821, system 10 may execute an operation to enlarge the size of the image displayed on user interface 40. Image display adjustment menu 820 may also include a reducing-image icon 822. When the user clicks reducing-image icon 822, system 10 may execute an operation to reduce the size of the image displayed on user interface 40. Image display changing menu 820 may also include a full screen icon 823. When the user clicks full screen icon 823, system 10 may execute an operation to expand the image displayed on user interface 40 to substantially occupy the entire screen. Image display adjustment menu 820 may also include a "1:1" icon 824. When the user clicks "1:1" icon 824, system 10 may execute an operation to display the image in the actual size on user interface 40.

User interface 40 may also include an image editing menu 830. Image editing menu 830 may include a plurality of functional buttons or sub-menus associated with various operations for editing an image. Image editing menu 830 may include an "auto levels" button for automatically adjusting levels of an image, an "RGB" button for adjusting the RGB color values, a "brightness/contrast" button for adjusting the brightness and/or the contrast, a "black & white" button for adding a black-and-white effect to the image, a "sepia stylus" button for applying a sepia effect to the image.

Image editing menu 830 may also include a "crop" button for cropping the image, an "auto fit" button for making the image automatically fit a specified space, a "full size" button for displaying the image in its full size, an "angle" button for changing an angle of the image, a "horizontal flip" button for flipping the image horizontally, a "vertical flip" button for flipping the image vertically. Image editing menu 830 may also include an "add text" button for adding a text to the image. Image editing menu 830 may also include an "add image frame" button for adding an image frame to the image. Image editing menu 830 may further include an "add mask frame" button for adding a mask frame to the image. In some embodiments, image editing menu 830 may include more or less number of buttons.

User interface 40 may also include a start button 840. The user may start an ordering process by selecting start button 840. In another embodiment, the user may start the ordering process by selecting the name of the bakery, store, or system 10, "Edible Studio." In some embodiments, the welcome screen shown in FIG. 8 may not display all of the menus 810, 820, and 830. In one embodiment, for example, the welcome screen may only include the name of the bakery, store, or system 10, and/or start button 840.

Figure 9:
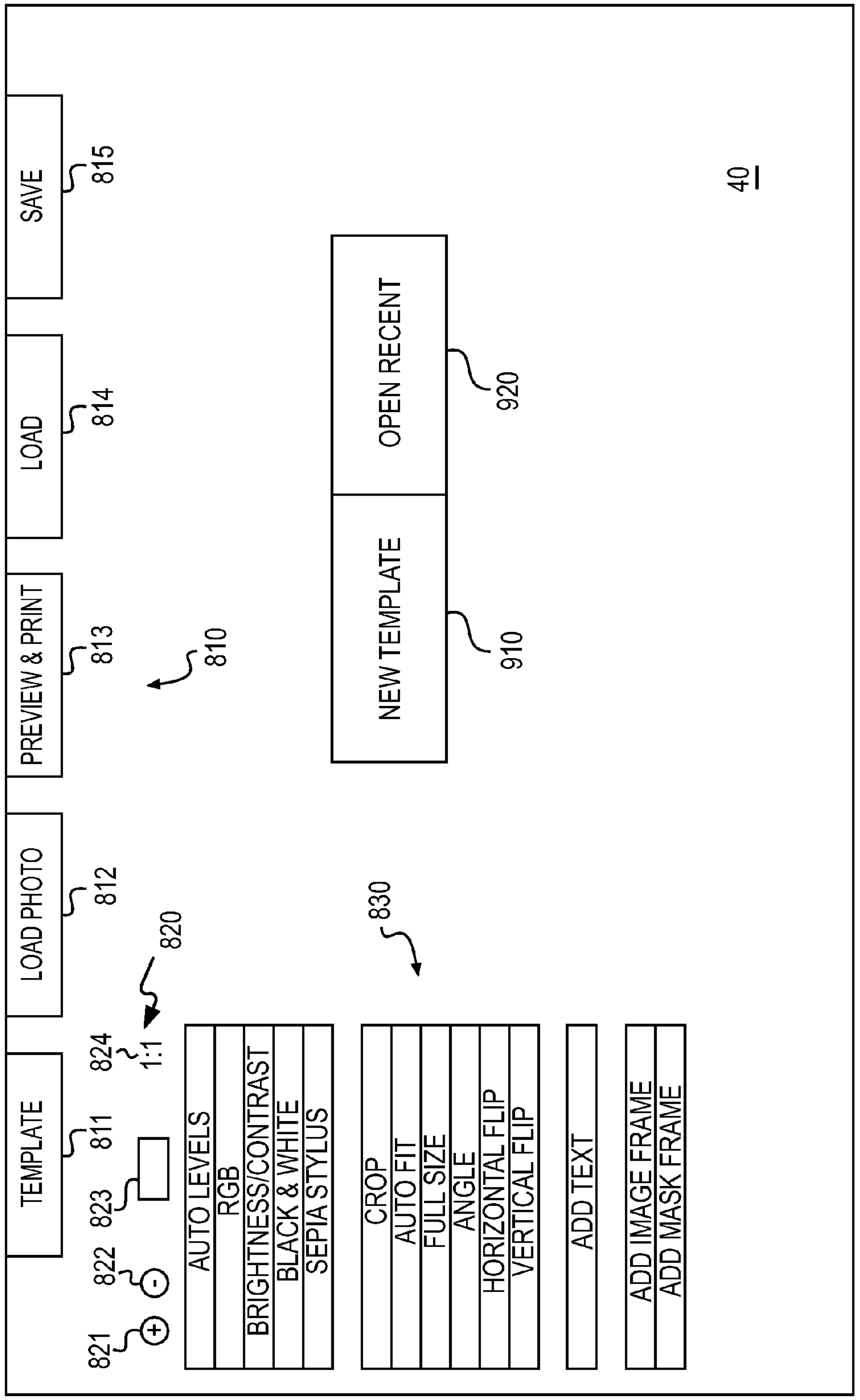
FIG. 9 is an exemplary screen display of user interface consistent with the disclosed embodiments.

FIG. 9 illustrates an exemplary screen display of user interface 40. In one embodiment, user interface 40 may display one or more of system menu 810, image display adjustment menu 820, and image editing menu 830. In another embodiment, user interface 40 may not display any of system menu 810, image display adjustment menu 820, or image editing menu 830. User interface 40 may display at least one of a first button 910 for creating a new template, or a second button 920 for opening a recently used template. First and second buttons 910 and 920 may be displayed after the user starts the ordering process by selecting the name of system 10, or by selecting start button 840 shown in FIG. 8. The user may select first button 910 to create a new template. Alternatively, the user may select second button 920 to open a recently used or created template.

Figure 10:
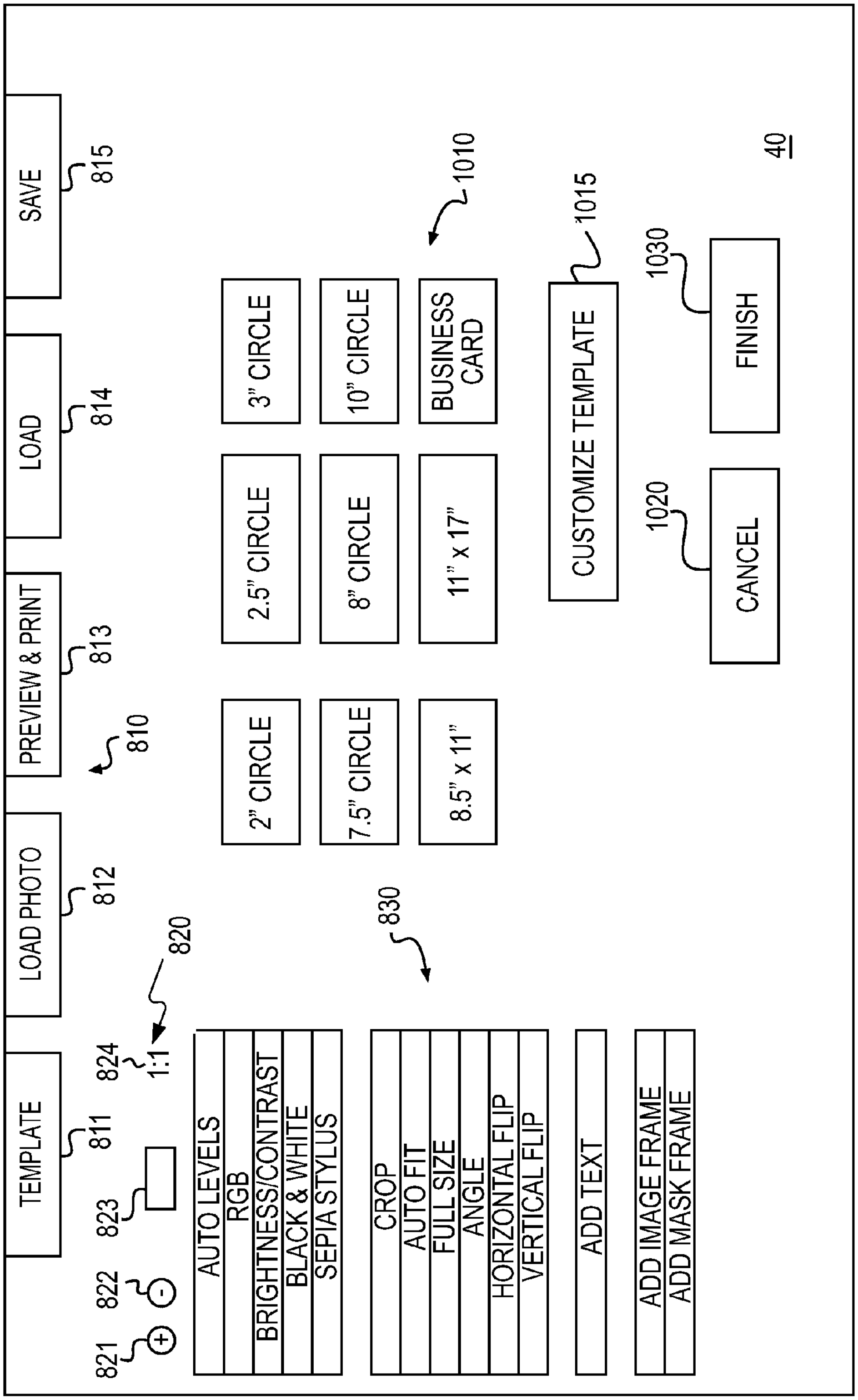
FIG. 10 is an exemplary screen display of user interface consistent with the disclosed embodiments.

FIG. 10 illustrates an exemplary screen display of user interface 40. The screen display shown in FIG. 10 may be displayed after the user selects the first button 910 for creating a new template, or the second button 920 for opening a recently used template, as shown in FIG. 9. In one embodiment, user interface 40 may display one or more of system menu 810, image display adjustment menu 820, and image editing menu 830. In another embodiment, user interface 40 may not display any of system menu 810, image display adjustment menu 820, or image editing menu 830.

User interface 40 may display a plurality of new or recently used templates 1010. In one embodiment, the plurality of templates 1010 may also be displayed when the user selects template button 811 from system menu 810. The user may select one or more templates from the plurality of templates 1010 for the image to be printed on edible image formation medium 90.

In some embodiments, each of templates 1010 may be associated with a shape and/or a size, which may correspond to a shape and/or a size of the food product on which the printed image will be placed. For example, templates 1010 may include a first number of templates specifying various diameters of a round cake, such as, e.g., a 2-inch circle, a 3-inch circle, and a 10-inch circle, etc. Templates 1010 may include a second number of templates specifying a size of a rectangular cake, e.g., an 8.5-inch by 11-inch cake, an 11-inch by 17-inch cake. Templates 1010 may also include a template for a business card shape, a note shape, or a post card shape. Templates 1010 may utilize any suitable shapes, such as triangles, squares, hearts, balloons, and polygons. Although in the exemplary templates, texts indicating the shape and/or size are shown for each template, it is understood that each template may be displayed as a shape with an indication of the size.

User interface 40 may further display a customize template button 1015. When the user select customize template button 1015, the user may customize a template, such as one selected from templates 1010 by specifying the shape and/or size of the template. In one embodiment, by selecting customize template button 1015, the user may create a new template.

After the user selects one or more templates, the user may cancel the selection by selecting a cancel button 1020. The user may also confirm the selection by selecting a finish button 1030. When the user selects cancel button 1020, the user may be asked to re-select a template from displayed templates 1010. The user may also be asked to create or customize a template using customize template button 1015. When the user selects finish button 1030, system 10 may proceed to a next step.

Figure 11:
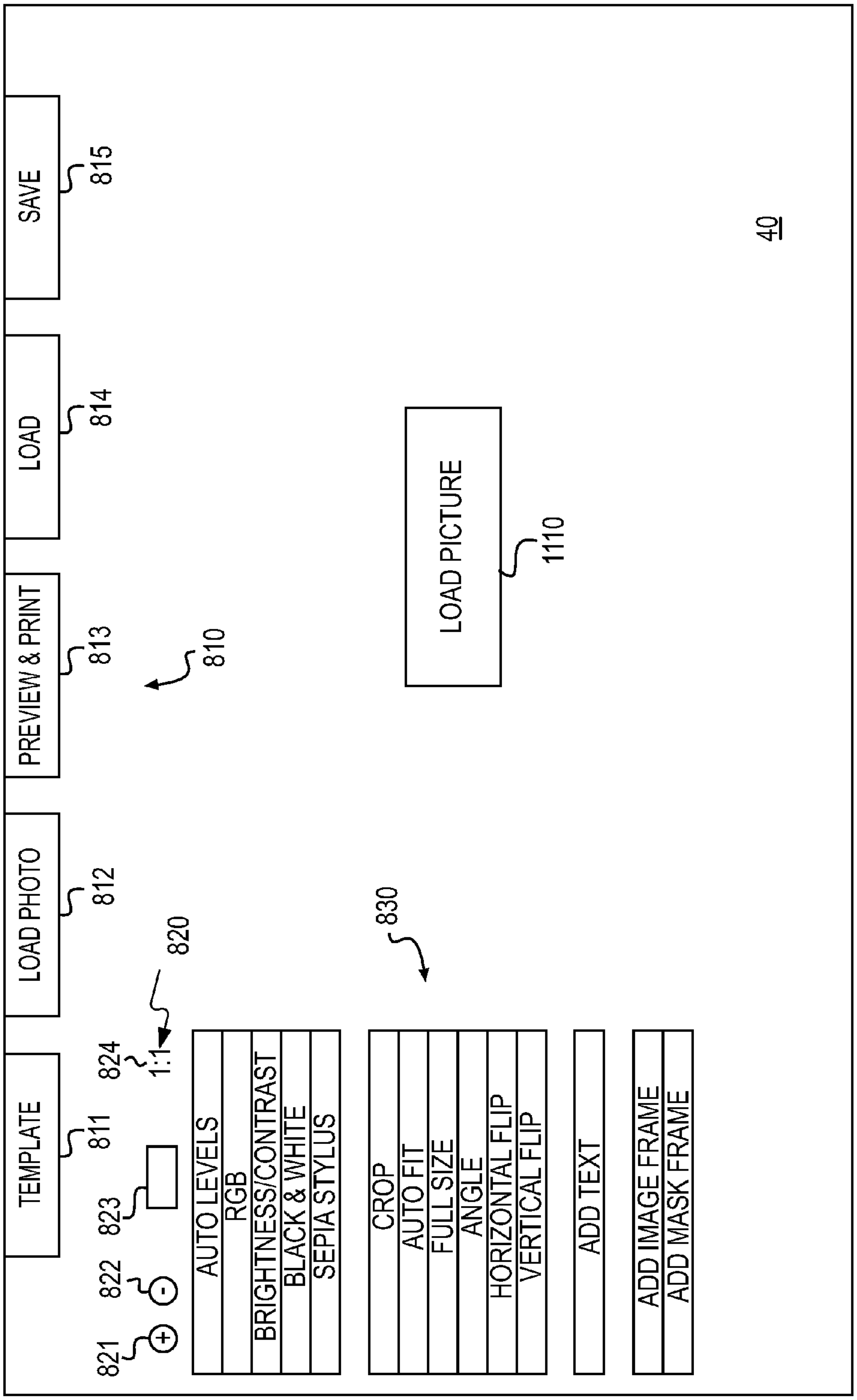
FIG. 11 is an exemplary screen display of user interface consistent with the disclosed embodiments.

FIG. 11 illustrates an exemplary screen display of user interface 40. In one embodiment, user interface 40 may display one or more of system menu 810, image display adjustment menu 820, and image editing menu 830. In another embodiment, user interface 40 may not display any of system menu 810, image display adjustment menu 820, or image editing menu 830. User interface 40 may display a load picture button 1110. By selecting load picture button 1110, the user may load an image, such as a picture or a photo, to be printed on edible image formation medium 90, from a source specified by the user. The source may include an image storage file on computer 20, or a periphery device connected to computer 20, such as scanner 80, a USB drive, a CD drive, and a DVD drive.

Figure 12:
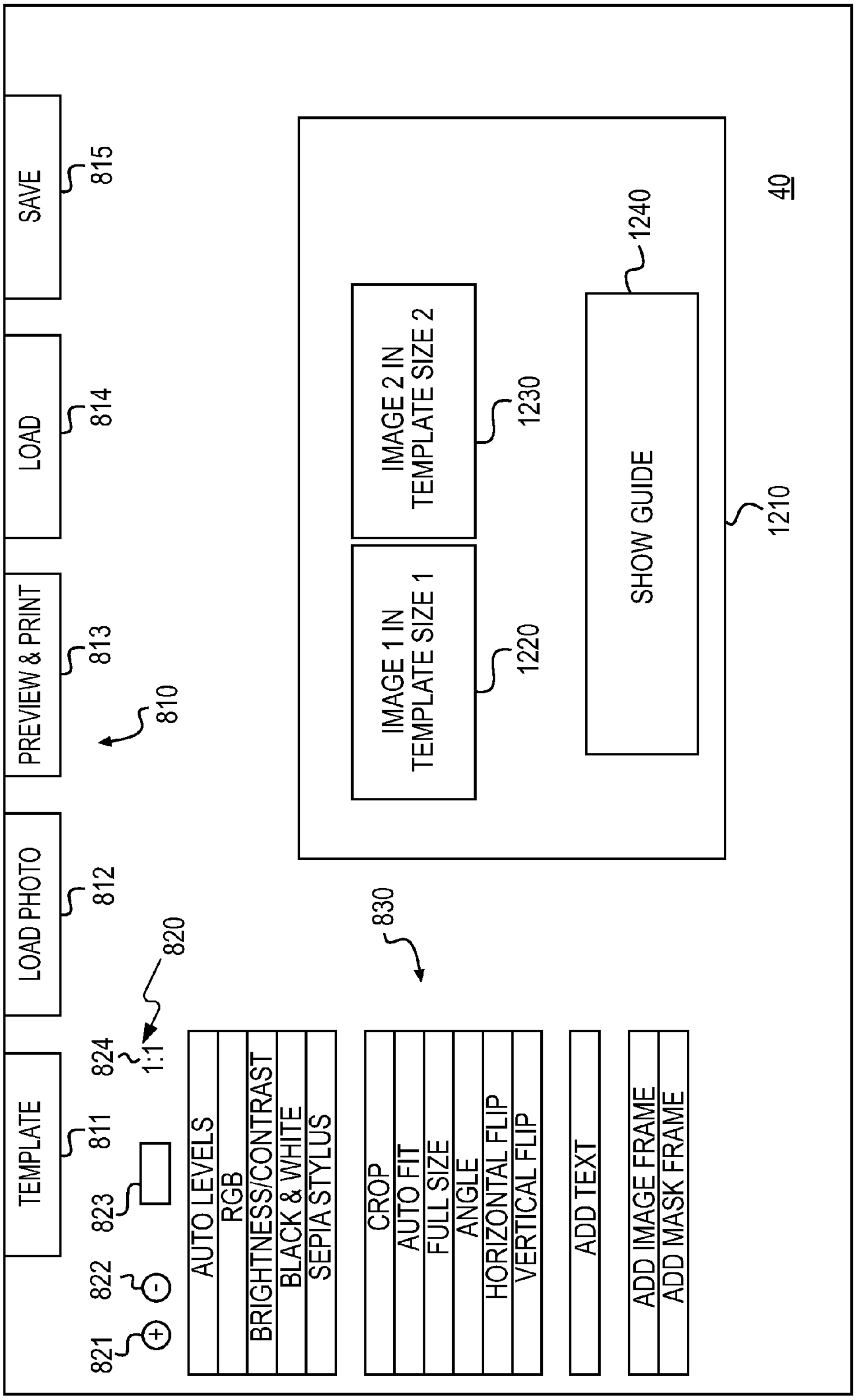
FIG. 12 is an exemplary screen display of user interface consistent with the disclosed embodiments.

FIG. 12 illustrates an exemplary screen display of user interface 40. In one embodiment, user interface 40 may display one or more of system menu 810, image display adjustment menu 820, and image editing menu 830. In another embodiment, user interface 40 may not display any of system menu 810, image display adjustment menu 820, or image editing menu 830.

After the user loads an image using load picture button 1110, as shown in FIG. 11, user interface 40 may display the image in the template selected or created in the process shown in FIG. 10. User interface 40 may display the image in the template shape and size in an image display area 1210. For example, user interface 40 may display a first image in a first template having a first shape and size, as indicated in box 1220, and a second image in a second template having a second shape and size, as indicated in box 1230. The first and second template may have the same or different shapes and sizes. The user may change the templates of the images, for example, using template button 811 from system menu 810. When the images are displayed in the specified templates, the user may add frames to the images, for example, using "Add Image Frame" button and/or "Add Mask Frame" button from image editing menu 830. User interface 40 may display the images in the specified templates and/or frames.

User interface 40 may also display a show guide box 1240 showing guide information to the user. The guide information may include any suitable information that may assist the user to process the image to achieve a desired effect. For example, the guide information may include instructions on how to adjust the template size and/or shape, and/or how to create new a template.

The user may select one of the first image shown in the first template, or the second image shown in the second template, and may change the display of the selected image in the associated template on user interface 40 using one or more of the functional icons shown in image display adjustment menu 820.

Figure 13:
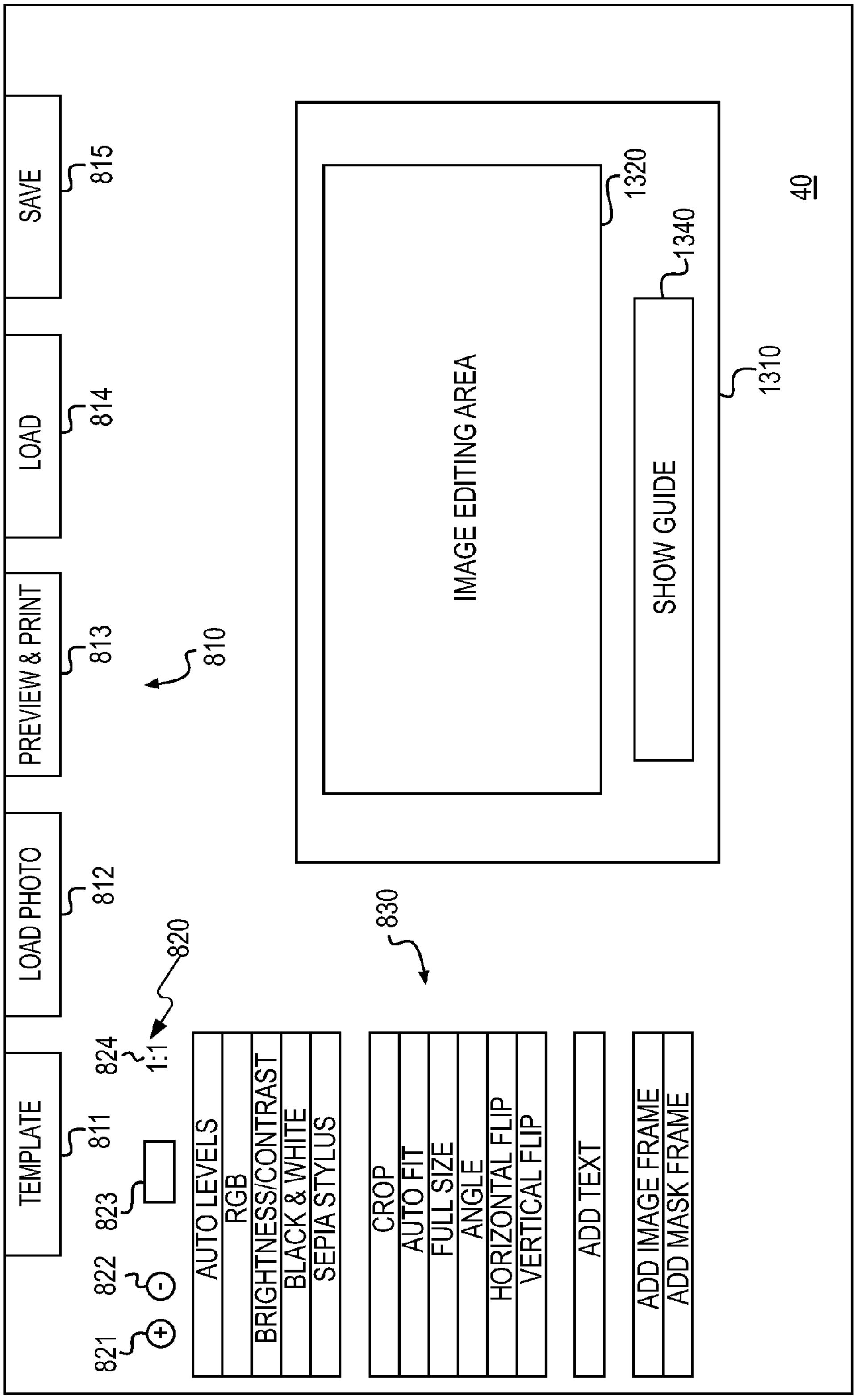
FIG. 13 is an exemplary screen display of user interface consistent with the disclosed embodiments.

FIG. 13 illustrates an exemplary display screen of user interface 40. In one embodiment, user interface 40 may display one or more of system menu 810, image display adjustment menu 820, and image editing menu 830. In another embodiment, user interface 40 may not selectively display one or more of system menu 810, image display adjustment menu 820, and image editing menu 830.

User interface 40 may display an area 1310, which may include an image editing area 1320. Image editing area 1320 may display an image to be edited by the user. With user interface 40, computer 20 may receive the user's edits of the image to be printed on edible image formation medium 90. In one embodiment, area 1310 may also display show guide box 1340.

The user may edit the image shown within image editing area 1420. The user may use various functional buttons and/or icons from system menu 810, image display adjustment menu 820, and image editing menu 830. For example, the user may change the template of the image using template button 811 from system menu 810. The user may change the display of the image using one or more functional icons from image display adjustment menu 820, for example, to confirm different effects of the image under different display conditions. The user may adjust the brightness and/or the contrast of the image, apply sepia effects to the image, and/or change the size, angle, and orientation. The user may also add texts and/or frames to the image. In some embodiments, the user may also add one or more images, such as pictures and photos, to the image that is being edited. For example, when editing a mother's picture, the user may add a smaller picture of a baby to be combined with the mother's picture.

Show guide box 1340 may display guide information to the user, for example, to help the user make edits to the image. The guide information may include any suitable information that may assist the user to achieve certain desired effects of the image. For example, the guide information may include instructions on how to adjust the image using image editing menu 830.

Figure 14:
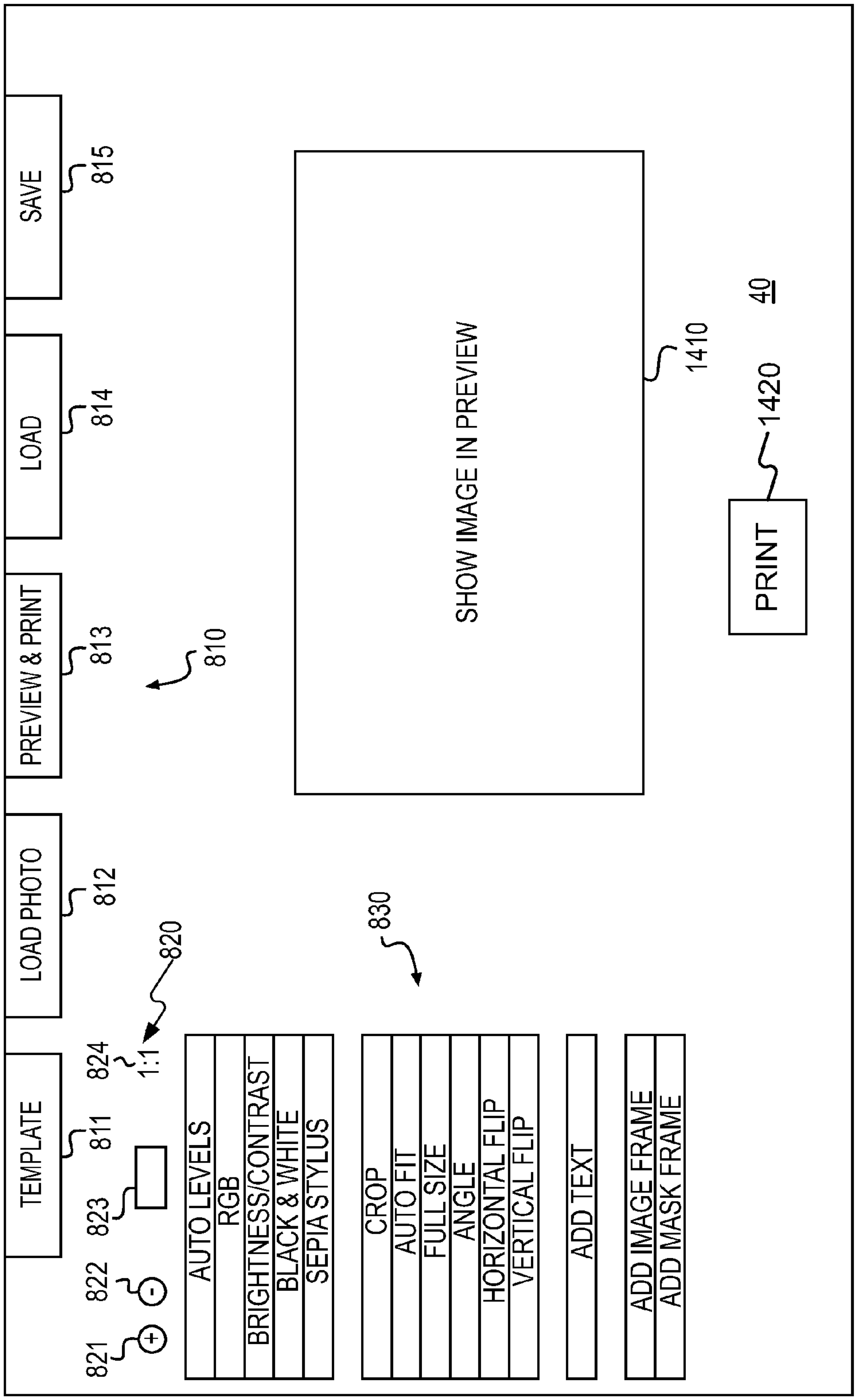
FIG. 14 is an exemplary screen display of user interface consistent with the disclosed embodiments.

FIG. 14 illustrates an exemplary screen display of user interface 40. In one embodiment, user interface 40 may display one or more of system menu 810, image display adjustment menu 820, and image editing menu 830. In another embodiment, user interface 40 may not display any of system menu 810, image display adjustment menu 820, or image editing menu 830.

After the user finishes editing the image, user interface 40 may display a preview area 1410 for the user to preview the printing effects of the image before the image is saved or printed on edible image formation medium 90 using printer 60. Preview area 1410 may be displayed when the user selects "preview & print" button 813 from system menu 810. User interface may display a print button 1420. When the user selects print button 1420, the image shown in the preview area 1410 may be printed on edible image formation medium 90 using printer 60. In one embodiment, the user may print the image shown in preview area 1410 on a regular paper to check the effects before the image is printed on edible image formation medium 90. The user may also save the image by selecting save button 815 from system menu 810.

Figure 15:
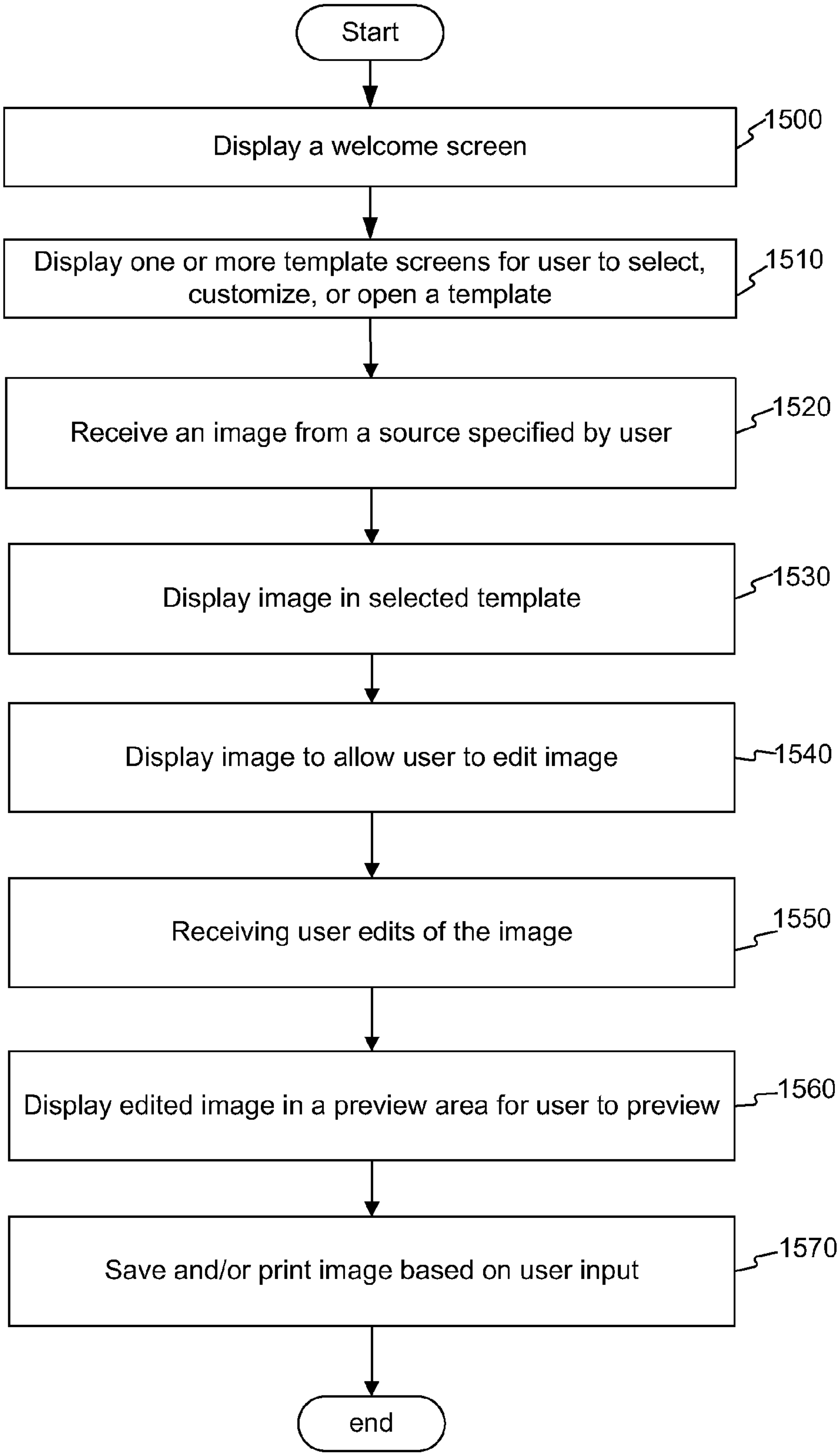
FIG. 15 is an exemplary functional process associated with the system shown in FIG. 1 consistent with the disclosed embodiments.

FIG. 15 illustrates an exemplary functional process associated with system 10. System 10 may display a welcome screen (Step 1500) on display device 30. The welcome screen may be similar to the screen displayed in FIG. 8. System 10 may display one or more template screens on display device 30, such as the ones shown in FIGS. 9 and 10 to allow the user to select, create, open, or customize a template (Step 1510). System 10 may receive an image from a source specified by the user (Step 1520). For example, system 10 may display an load picture screen, such as the one shown in FIG. 11, to allow the user to load an image from computer 20 or a periphery device connected with computer 20, or to scan an image from a specified scanner.

System 10 may display the image in the selected template (Step 1530). While the image is displayed in selected template, the user may make changes to the template, or add frames to the image. If frames are added to the image, system 10 may display the image in both the selected template, and with the specified frames.

System 10 may display the image in an image editing area to allow the user to edit the image (Step 1540). System 10 may receive the user's edits to the image, for example, addition of texts to the image, change of the size of the image, and change of the brightness and/or contrast of the image (Step 1550). System 10 may display the edited image in a preview area for the user to preview the image (Step 1560). The user may decide whether the edited image has achieved the desired effects. System 10 may save and/or print the image based on the user's input received through user interface 40 (Step 1570). For example, the user may save the image using save button 815 from system menu 810, or print the image using print button 1420. An edible decorative item is generated when the image is printed on edible image formation medium 90 using printer 60 and spongeless ink cartridge 240 provided in printer 60. The edible decorative item may be placed on food product 100, such as a cake.

The disclosed system may be employed in any commercial store or bakery for generating edible decorative items for food products, such as cakes and cookies. The disclosed system may also be employed at home for personal use. The disclosed spongeless ink cartridge may be employed in any image forming apparatus, including, for example, inkjet printers, laserjet printers, and photocopiers. Compared to a conventional ink cartridge, the disclosed ink cartridge does not have a sponge to take up a substantial space in the ink cartridge. Therefore, more ink may be stored in the disclosed ink cartridge than the conventional ink cartridge. As a result, the disclosed ink cartridge may require less frequent refill of the ink or replacement under the same usage condition as compared to the conventional ink cartridge.

With the disclosed air tube having the air control valve, ink flow during printing may be effectively and accurately controlled. The employment of the disclosed air tube having the air control valve may also eliminate the use of a sponge, making the ink cartridge spongeless.

With no sponge disposed within the disclosed spongeless ink cartridge, the chance for mold, yeast, and bacteria to grow may be significantly reduced. Therefore, the hygienic condition of the edible decorative items printed using the disclosed spongeless ink cartridge may be significantly improved as compared to that of the edible decorative items printed using the conventional ink cartridge.

With the disclosed plug, the ink exit port may be sealed tightly when the disclosed spongeless ink cartridge is not used for printing, thereby preventing ink from being exposed to outside air and consequently reducing the speed of ink dry up. As a result, the life cycle of the disclosed spongeless ink cartridge may be significantly elongated as compared to the conventional ink cartridge.

It will be apparent to those skilled in the art that various modifications and variations can be made in the disclosed system. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A system for generating an edible decorative item for a food product, comprising:

a computer including:

a processor for executing computer program codes; and a display device in communication with the processor; and an image forming apparatus in communication with the computer, the image forming apparatus including:

a spongeless ink cartridge for storing an edible ink, wherein the spongeless ink cartridge does not include a sponge; and an image forming unit for forming an image on an edible image formation medium to generate the edible decorative item, wherein the spongeless ink cartridge includes:

an ink exit port; and a plug removably attached to the ink exit port to cover the ink exit port, the plug having an opening that opens for the ink to exit during printing and that closes when printing is not performed.

2. The system of claim 1, wherein the display device includes a touch screen.

3. The system of claim 1, wherein the image forming apparatus is a printer, and wherein the image forming unit is a print head.

4. The system of claim 3, wherein the printer includes both a printing function and a scanning function.

5. The system of claim 3, wherein the print head is removable from the printer.

6. The system of claim 1, wherein the spongeless ink cartridge further includes an air tube.

7. The system of claim 6, wherein the air tube includes an air control valve.

8. The system of claim 6, wherein the air tube is disposed within an inner space enclosed by a housing of the spongeless ink cartridge, the inner space being configured for storing the edible ink.

9. The system of claim 1, wherein the plug is made of a silicon rubber type material.

10. The system of claim 1, wherein the opening of the plug includes a single-line-cut shape.

11. The system of claim 1, wherein the opening of the plug includes a crossing-line-cut shape.

12. A system for generating an edible decorative item for a food product, comprising:

a computer including:

a processor for executing computer program codes; and a display device in communication with the processor; and an image forming apparatus in communication with the computer, the image forming apparatus including:

a spongeless ink cartridge for storing an edible ink, wherein the spongeless ink cartridge does not include a sponge; and an image forming unit for forming an image on an edible image formation medium to generate the edible decorative item, wherein the spongeless ink cartridge includes an ink exit port made of a silicon rubber type material, the ink exit port including an opening that opens for the ink to exit during printing, and that closes when printing is not performed.

13. A system for generating an edible decorative item for a food product, comprising:

a computer including:

a processor for executing computer program codes; and a display device in communication with the processor; and an image forming apparatus in communication with the computer, including:

a spongeless ink cartridge for storing an edible ink, wherein the spongeless ink cartridge does not include a sponge; and an image forming unit for forming an image on an edible image formation medium to generate the edible decorative item, wherein the spongeless ink cartridge further includes an ink exit port made of an elastic material, the ink exit port including an opening that opens for the ink to exit during printing, and that closes when printing is not performed.

14. The system of claim 13, wherein the spongeless ink cartridge further includes:

a housing, wherein an inner space enclosed by the housing is substantially used for storing the edible ink;

an air vent hole; and an air tube disposed within the housing and extending from the air vent hole to the inner space.

15. The system of claim 14, wherein the air vent hole is located at a first end of the air tube, and wherein the air tube includes an air control valve at a second end.

16. The system of claim 15, wherein the air control valve is disposed at a position close to a bottom side of the housing when the spongeless ink cartridge is installed in a printer.

* * * * *